Oct. 17, 1950 — T. W. SLABACK — 2,525,964
BUMPER GUARD AND TRAILER HITCH
Filed June 8, 1948
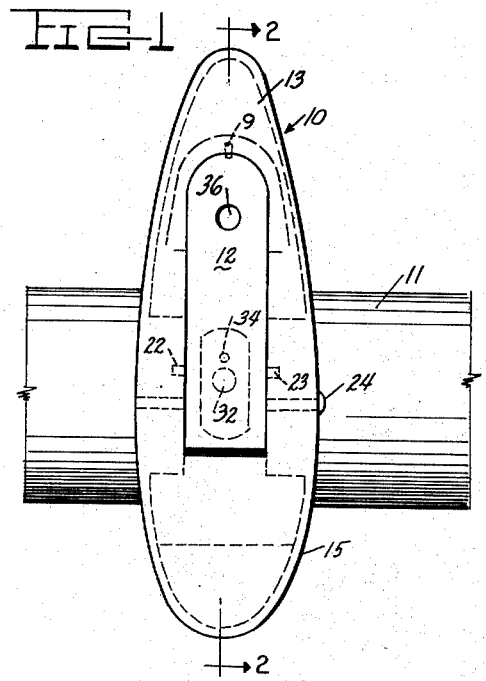
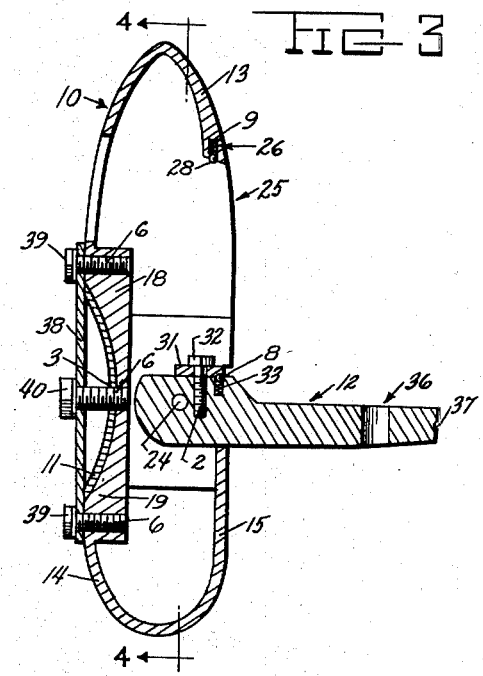
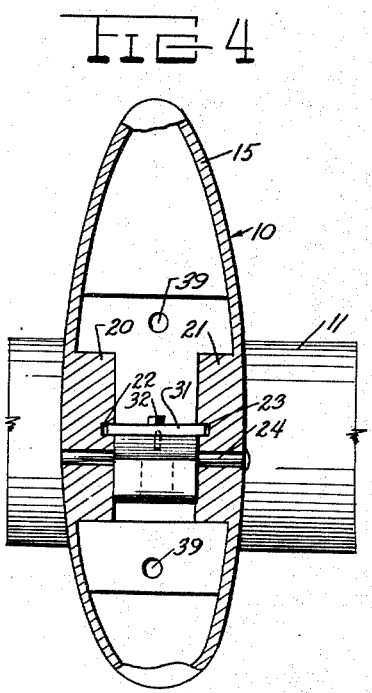
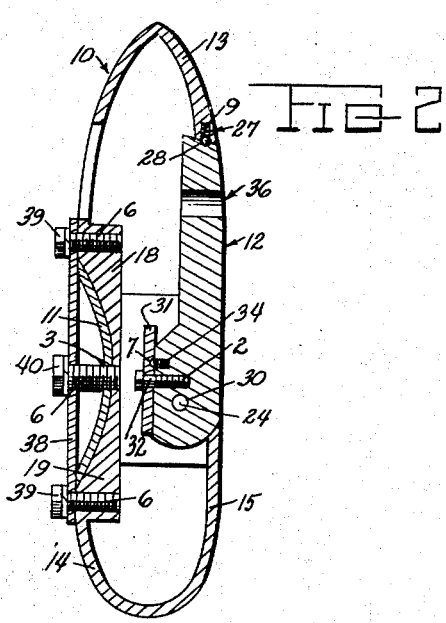
INVENTOR.
Travis W. Slaback
BY
McMorrow, Berman & Davidson
ATTORNEYS Patented Oct. 17, 1950

2,525,964

UNITED STATES PATENT OFFICE 2,525,964

BUMPER GUARD AND TRAILER HITCH

Travis W. Slaback, Chanute, Kans.

Application June 8, 1948, Serial No. 31,647

5 Claims. (Cl. 280—33.44)

This invention relates to a bumper guard including a trailer hitch as a part thereof.

An object of the invention is to provide a bumper guard including a trailer hitch which is normally housed in the guard and is shiftable into operative position upon the will of the operator.

Another object of the invention is to provide a bumper guard in which there is mounted a trailer hitch for movement into an operative position and when in such operative position may be releasably so maintained.

A further object of the invention is to provide a bumper guard and trailer hitch which is simple in structure, easy to manipulate and highly efficient in action.

Other objects and advantages will become apparent from the description. An embodiment of the invention is illustrated by way of example in the accompanying drawings, wherein:

Figure 1 is a front elevational view showing the bumper guard of the present invention attached to the bumper, with the trailer hitch in vertical or inoperative position;

Figure 2 is a sectional view taken on the line 2—2 of Figure 1;

Figure 3 is a side elevational sectional view of the bumper guard, but showing the trailer hitch in its horizontal or operative position, the lock bar being moved so as to maintain the trailer hitch in such position;

Figure 4 is a sectional view taken on the line 4—4 of Figure 3.

Referring to the drawings, the bumper guard of the present invention broadly comprises a guard 10 having a hitch 12 pivotally connected to the guard 10, the guard 10 being mounted on a bumper 11.

More specifically, the guard 10 embodies a hollow housing 13 having in its rear face 15 a cut-out 25 for a purpose to be subsequently described. Mounted within the front face 14 of the housing 13 and carried thereby is a block 18, said block being provided with an arcuately-shaped recess 19. The block 18 is provided with a plurality of spaced, aligned, threaded apertures 6 for a purpose to be subsequently described.

Positioned within the housing 13 adjacent the cut-out 25 are a pair of spacer blocks 20 and 21, said blocks being arranged in spaced, aligned relation with respect to each other and carried by said housing. The spacer blocks 20 and 21 are each provided with a rectangular slot 22 and 23, respectively, the slots being arranged in aligned opposed relation.

Mounted for swinging movement about a horizontal axis toward and away from the cut-out 25 is the hitch or towing bar 12. The hitch or towing bar 12 is pivotally supported on a horizontally-disposed pin 24 extending through the spacer blocks 22 and 23. Formed in the upper portion of the wall defining the cut-out 25 is a socket 9 for the reception of a spring lock 26. The spring lock 26 embodies a coil spring 27, Figure 2, having one end secured to said wall and its other end fixedly secured to a ball 28 for normally biasing the latter out of the socket 9.

The hitch or towing bar 12 is provided with an opening 30 adjacent the end thereof in which is received the pin 24 to thereby provide a pivotal support for the towing bar 12. The towing bar 12 is provided with a threaded aperture 2 arranged at right angles with respect to the pin 24 and positioned adjacent the inner end of said towing bar 12. Arranged in superposed relation with respect to one face of the towing bar 12 is an apertured, rectangularly-shaped lock bar 31. The lock bar 31 is pivotally connected to the towing bar 12 by means of a threaded bolt 32 extending through the apertured lock bar 31, the bolt 32 being in threaded engagement with the threaded aperture 2 of the towing bar 12. The lock bar 31 is provided with a pair of spaced, arcuately-shaped recesses 7 and 8 for a purpose to be subsequently described. The towing bar 12 is provided with a socket 33 on its inner face in which is mounted a ball and spring lock 34 of the same construction as spring lock 26. The towing bar 12 is provided with an opening 36 extending therethrough for the reception therein of a towing element. The outer end of the towing bar 12 has a recess 37 therein which receives the ball 28 of the spring lock 26 to releasably maintain the towing bar 12 in its vertical or inoperative position.

The convex surface of the bumper 11 is seated in the arcuately-shaped recess 19 of the block 18, and an apertured flat plate 38 is positioned against the concave side of the bumper 11. The apertured plate 38 is detachably secured to the block 18 by means of threaded bolts 39 and 40 threadedly engaging the threaded apertures 6 and 3, respectively, thereby securing the guard 10 to the bumper 11.

During normal use of the bumper guard and hitch, the towing bar 12 is in the vertical or inoperative position in bridging relation with respect to the cut-out 25 of the rear face 15, as shown in Figures 1 and 2, the towing bar being maintained in such position by the engagement of the ball 28 of the spring lock 26 with the recess 37 in the end of the towing bar 12. The lock bar 31, when the towing bar 12 is in vertical or inoperative position, is in back of the towing bar 12 in a position such that the towing bar is free to pivot about the pin 24, Figures 1 and 2, and maintained in this position by engagement of the spring lock 34 with the recess 7 of the lock bar 31. When it is desired to tow a vehicle, the towing bar 22 is moved from its vertical position, Figures 1 and 2, to its horizontal position, Figures 3 and 4, so that a towing line can be inserted through the opening 36 of the towing bar 12. To maintain the towing bar in its horizontal or operative position, the lock bar 31 is pivoted 90° about the bolt 32 so that the ends of the lock bar 31 are in engagement with the rectangular slots 22 and 23 of the blocks 20 and 21. With the lock bar 31 in engagement with the slots 22 and 23, the spring lock 34 is in engagement with the recess 8 in the lock bar 31 to thereby releasably maintain the towing bar in its horizontal or operative position.

From the foregoing description and a study of the drawings, it will be apparent that I have provided a new construction. It is, of course, to be understood that I reserve the right to make such changes in the form, construction and arrangement of the parts as will not depart from the spirit of the invention or the scope of the appended claims.

I claim:

1. A trailer hitch adapted to be mounted on a vehicle bumper bar, said hitch comprising a vertically elongated hollow casing, means for securing said casing stationarily on the bumper bar to serve as a bumper guard, and a tow bar pivoted on a horizontal transverse axis within said hollow casing and normally occupying a vertical position in closing relation to an opening provided in a wall of said casing, said tow bar being swingable to a horizontal operative position extending outwardly through said opening and beyond said casing.

2. A trailer hitch adapted to be mounted on a vehicle bumper bar, said hitch comprising a vertically elongated hollow casing, means for securing said casing stationarily on the bumper bar to serve as a bumper guard, and a tow bar pivoted on a horizontal transverse axis within said hollow casing and normally occupying a vertical position in closing relation to an opening provided in a wall of said casing, said tow bar being swingable to a horizontal operative position extending outwardly through said opening and beyond said casing, releasable detent means operating between a portion of said casing and the outer end of said tow bar for holding said tow bar in its normal vertical position in said opening.

3. A trailer hitch adapted to be mounted on a vehicle bumper bar, said hitch comprising a vertically elongated hollow casing, means for securing said casing stationarily on the bumper bar to serve as a bumper guard, and a tow bar pivoted on a horizontal transverse axis within said hollow casing and normally occupying a vertical position in closing relation to an opening provided in a wall of said casing, said tow bar being swingable to a horizontal operative position extending outwardly through said opening and beyond said casing, releasable lock means operating between a portion of said casing and a portion intermediate the ends of said tow bar for locking said tow bar in its horizontal operative position.

4. A trailer hitch adapted for mounting on a vehicle bumper bar, said hitch comprising a vertically elongated hollow casing, means for securing said casing fixedly with the inner wall thereof against the exposed face of the bumper bar to serve as a bumper guard with the outer wall of the casing spaced outwardly from the exposed face of the bumper guard, said outer wall of said casing being formed with an opening, a tow bar having its inner end pivoted on a horizontal transverse axis within said casing, said tow bar normally occupying a vertical position in closing relation to the opening in the outer wall of said casing, said tow bar being swingable to a horizontal operative position through said opening and extending outwardly beyond said outer casing wall.

5. A trailer hitch adapted for mounting on a vehicle bumper bar, said hitch comprising a vertically elongated hollow casing, means for securing said casing fixedly with the inner wall thereof against the exposed face of the bumper bar to serve as a bumper guard with the outer wall of the casing spaced outwardly from the exposed face of the bumper guard, said outer wall of said casing being formed with an opening, a tow bar having its inner end pivoted on a horizontal transverse axis within said casing, said tow bar normally occupying a vertical position in closing relation to the opening in the outer wall of said casing, said tow bar being swingable to a horizontal operative position through said opening and extending outwardly beyond said outer casing wall, releasable detent means for holding said tow bar in its normal vertical position in said opening, and releasable lock means for locking said tow bar in its horizontal operative position.

TRAVIS W. SLABACK.

REFERENCES CITED

The following references are of record in the file of this patent:

UNITED STATES PATENTS

| Number | Name | Date |
| --- | --- | --- |
| 2,378,504 | Roos | Jan. 19, 1945 |
| 2,399,810 | Ketcham | May 7, 1946 |